(12) United States Patent
Fisher et al.

(10) Patent No.: US 12,476,588 B2
(45) Date of Patent: Nov. 18, 2025

(54) SOLAR DEVICES AND METHODS

(71) Applicant: FRACSUN, INC., San Luis Obispo, CA (US)

(72) Inventors: Bryan Fisher, San Luis Obispo, CA (US); Catlin Mattheis, San Luis Obispo, CA (US); Scott Lewis, San Luis Obispo, CA (US)

(73) Assignee: FRACSUN INC., San Luis Obispo, CA (US)

( * ) Notice: Subject to any disclaimer, the term of this patent is extended or adjusted under 35 U.S.C. 154(b) by 125 days.

(21) Appl. No.: 18/011,143

(22) PCT Filed: Jul. 8, 2020

(86) PCT No.: PCT/US2020/041280
§ 371 (c)(1),
(2) Date: Dec. 16, 2022

(87) PCT Pub. No.: WO2022/010477
PCT Pub. Date: Jan. 13, 2022

(65) Prior Publication Data
US 2023/0216447 A1   Jul. 6, 2023

(51) Int. Cl.
*H02S 50/10* (2014.01)
*H02S 40/10* (2014.01)
*H02S 40/38* (2014.01)

(52) U.S. Cl.
CPC ............. *H02S 50/10* (2014.12); *H02S 40/10* (2014.12); *H02S 40/38* (2014.12)

(58) Field of Classification Search
CPC .......... H02S 50/10; H02S 40/10; H02S 40/38; H02S 50/00; G01R 31/52; Y02E 10/50

(Continued)

(56) References Cited

U.S. PATENT DOCUMENTS

| 4,528,503 A | 7/1985 | Cole |
| 8,473,250 B2 * | 6/2013 | Adest ................... G01R 21/133 |
| | | 702/182 |

(Continued)

FOREIGN PATENT DOCUMENTS

| CN | 108206670 A | * | 6/2018 | ............. H02S 50/10 |
| CN | 208738276 U | * | 4/2019 | |

(Continued)

OTHER PUBLICATIONS

Extended European Search Report issued in European Application No. 20944328. 2 issued Feb. 12, 2024.

(Continued)

*Primary Examiner* — Neel D Shah
*Assistant Examiner* — Robert P Alejnikov, Jr.
(74) *Attorney, Agent, or Firm* — Ferguson Case Orr Paterson

(57) ABSTRACT

Photovoltaic array performance monitoring systems and methods are described herein. One embodiment of a photovoltaic array monitoring system according to the present disclosure can include a reference photovoltaic panel and an ambient photovoltaic panel, as well as a rechargeable power source. The monitoring system can further include an electrical unit configured to charge the rechargeable power source using energy from one or both of the reference photovoltaic panel and the ambient photovoltaic panel. The monitoring system can also include a transmitter configured to transmit data from the reference photovoltaic panel and the ambient photovoltaic panel. Methods and full-size solar systems utilizing monitoring systems are also described.

22 Claims, 7 Drawing Sheets

(58) Field of Classification Search
USPC .................................................. 324/764.01
See application file for complete search history.

(56) References Cited

U.S. PATENT DOCUMENTS

| | | | | |
|---|---|---|---|---|
| 2006/0162772 | A1* | 7/2006 | Presher, Jr. ............... | H02J 7/35 |
| | | | | 136/251 |
| 2012/0316802 | A1* | 12/2012 | Presher, Jr. ............. | H02J 3/381 |
| | | | | 702/58 |
| 2013/0159064 | A1 | 6/2013 | Fisher et al. | |
| 2015/0280644 | A1 | 10/2015 | Gostein et al. | |
| 2016/0104084 | A1 | 4/2016 | Philip et al. | |
| 2016/0134191 | A1 | 5/2016 | Teggatz et al. | |
| 2018/0254741 | A1 | 9/2018 | Jones | |
| 2020/0169091 | A1* | 5/2020 | Vlasov .................. | H02J 7/0014 |

FOREIGN PATENT DOCUMENTS

| | | | | | |
|---|---|---|---|---|---|
| FR | 2971368 | A1 | * | 8/2012 | ............ G01J 1/0228 |
| KR | 101602844 | B1 | * | 3/2016 | |
| KR | 101895792 | B1 | * | 9/2018 | |
| KR | 101920065 | B1 | * | 11/2018 | |
| WO | WO-2016063750 | A1 | * | 4/2016 | ............... B08B 1/00 |

OTHER PUBLICATIONS

EPO Communication pursuant to Rules 70(2) and 70a(2)EPC issued in European Application No. 20944328.2 issued Feb. 29, 2024.
International Search Report issued in PCT/US2020/041280, mailed Oct. 1, 2020.
International Written Report issued in PCT/US2020/041280, mailed Oct. 1, 2020.
Matasci, S. "What is the average solar pane size and weight?" energysage; Publication Jun. 1, 2017.

* cited by examiner

SOLAR DEVICES AND METHODS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

Field

This application is directed generally toward photovoltaic systems and more specifically to photovoltaic system monitoring systems and methods.

Description of the Related Art

Photovoltaic arrays are increasingly being installed as an alternative to fossil fuels which generate greenhouse gases. For efficient operation, the photovoltaic panels which make up a photovoltaic array require an unobstructed view of the sun to generate maximum power output during daylight hours. In certain installations, particularly in arid desert regions, soiling of the photovoltaic array due to collection of dust and other debris upon the photovoltaic array reduces the amount of energy generated.

Given the passive nature of the photovoltaic array, sites housing photovoltaic arrays are typically unmanned for extended periods of time. Thus, declining electrical generation from the photovoltaic arrays may go unnoticed. Accordingly, there is a need to address soiling of the photovoltaic arrays before significant energy generation is compromised. Generally, U.S. Pat. No. 8,951,356 to Fisher et al. describes systems and methods utilizing a reference photovoltaic panel that is kept relatively free of soiling compared to a proximate ambient photovoltaic panel, with a comparison of energy generation between the reference and ambient panels used to determine when it would be cost-effective to clean the photovoltaic array. U.S. Pat. No. 8,951,356 to Fisher et al., entitled "Photovoltaic Array Performance Monitoring System," is fully incorporated by reference herein in its entirety.

SUMMARY OF THE DISCLOSURE

Photovoltaic array performance monitoring systems and methods are described herein.

One embodiment of a photovoltaic array monitoring system according to the present disclosure can include a reference photovoltaic panel and an ambient photovoltaic panel, as well as a rechargeable power source. The system can further include an electrical unit configured to charge the rechargeable power source using energy from one or both of the reference photovoltaic panel and the ambient photovoltaic panel. The system can also include a transmitter (including but not limited to a transceiver) configured to transmit data from the reference photovoltaic panel and the ambient photovoltaic panel.

One embodiment of a method for monitoring a solar array comprising one or more solar panels according to the present disclosure can include placing a monitoring system proximate to the solar array. The monitoring system can include a reference photovoltaic panel, an ambient photovoltaic panel, and a rechargeable power source. The method can further include charging the rechargeable power source using energy produced by the reference photovoltaic panel and/or the ambient photovoltaic panel. The method can further include measuring data such as short-circuit current, irradiance, and/or temperature from each of the reference photovoltaic panel and the ambient photovoltaic panel, and transmitting that data from the monitoring system.

One embodiment of a photovoltaic system according to the present disclosure includes at least one solar panel with a photovoltaic area of at least 1.5 $m^2$, and a photovoltaic array monitoring system. The monitoring system can include a reference photovoltaic panel, an ambient photovoltaic panel, a rechargeable power source, an electrical unit, and a transmitter. The electrical unit can be configured to charge the rechargeable power source using energy from one or both of the reference photovoltaic panel and the ambient photovoltaic panel. The transmitter can be configured to transmit data collected from the reference photovoltaic panel and the ambient photovoltaic panel. The system can include a soiling removal unit configured to clean soiling from the reference photovoltaic panel. The soiling removal unit can be part of the monitoring system, or can be separate therefrom. The reference and ambient photovoltaic panels can combine to form a photovoltaic area that is less than 0.25 $m^2$. The data collected from the reference and ambient photovoltaic panels can include one or more of short-circuit current, irradiance, and temperature from each of the reference and ambient photovoltaic panels, and can be used in combination with other information to determine an efficient cleaning schedule for the at least one full-size solar panel.

These and other further features and advantages of the disclosure would be apparent to those skilled in the art from the following detailed description, taken together with the accompanying drawings.

BRIEF DESCRIPTION OF THE DRAWINGS

The features and advantages of the various exemplary embodiments will become apparent from the following detailed description when considered in conjunction with the accompanying drawings. Where possible, the same reference numerals and characters are used to denote like features, elements, components or portions of the inventive embodiments. It is intended that changes and modifications can be made to the described exemplary embodiments without departing from the true scope and spirit of the inventive embodiments described herein as defined by the claims.

DETAILED DESCRIPTION OF THE INVENTION

Figure 1:
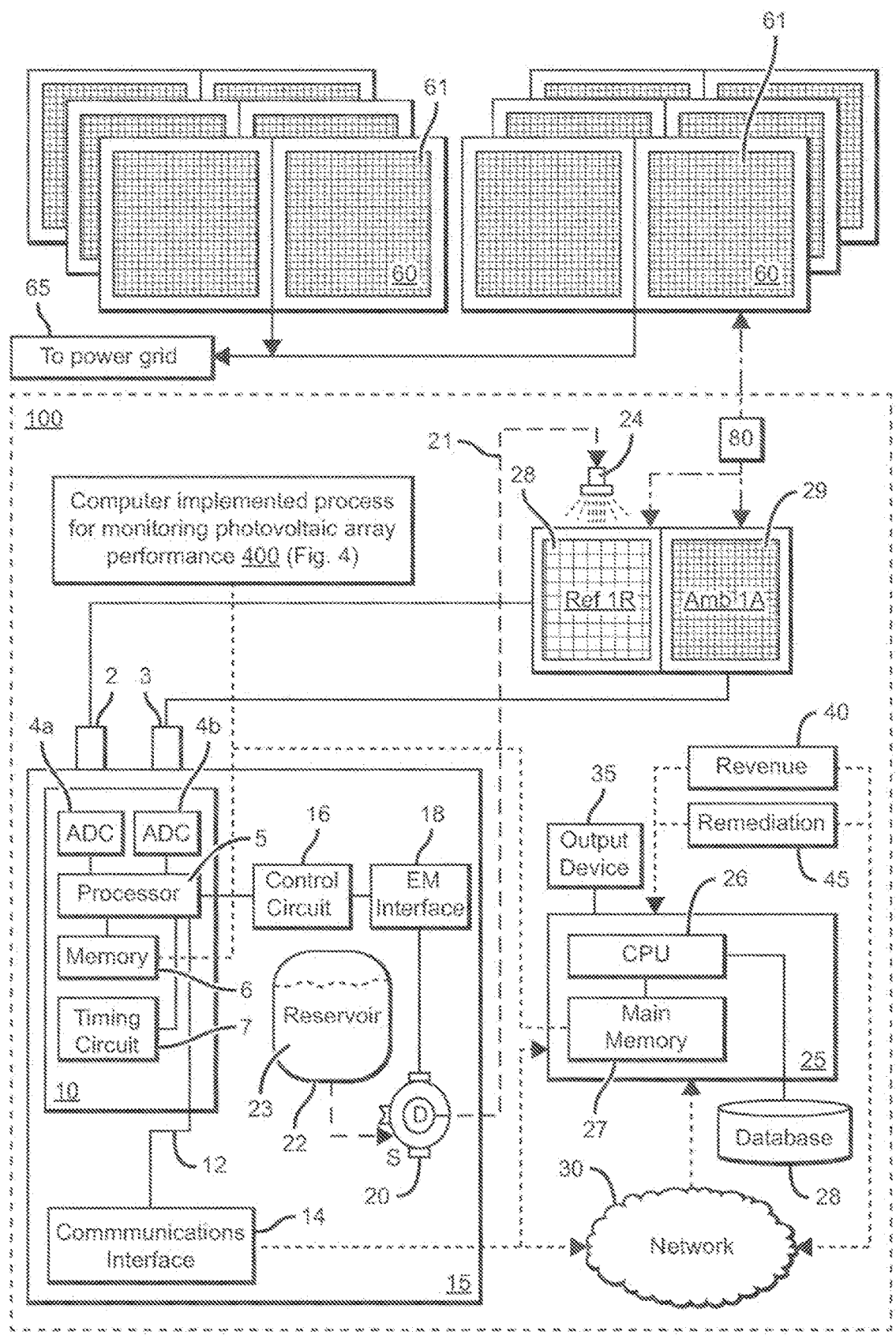
FIG. 1 is a block diagram of a photovoltaic array performance monitoring apparatus according to one embodiment of the present disclosure.

Photovoltaic array performance monitoring systems, as well as methods and systems incorporating these monitoring systems, are described herein. Monitoring systems according to embodiments of the present disclosure can include a reference photovoltaic panel and an ambient photovoltaic panel. It is understood that when the term "panel" when used in reference to the reference photovoltaic panel and/or the ambient photovoltaic panel, or as part of theses phrases, unless the context requires otherwise or explicitly stated otherwise, this includes both single-cell embodiments and multi-cell embodiments (i.e., the "reference photovoltaic panel" could include only a single photovoltaic cell or a plurality of cells, and/or the "ambient photovoltaic panel" could include only a single photovoltaic cell or a plurality of cells). The reference photovoltaic panel is kept relatively (ideally, perfectly) clean, substantially equivalent to a panel that had just undergone a cleaning; while the ambient photovoltaic panel is allowed to collect soiling and/or otherwise become dirtied. Measurements from the reference and ambient panels can be taken, and can be indicative of the performance of a proximate solar array and/or full-size panel(s). This data can be used in conjunction with other information to determine the most efficient cleaning schedule for the array and/or full-size panel(s). The monitoring system can include a transmitter for sending this data. Additionally, the monitoring system can include its own power source, such as an internal rechargeable battery. The reference photovoltaic panel and/or the ambient photovoltaic panel can switch between two modes: energy harvesting mode, where the panel is/panels are used to charge the power source; and measurement mode, where data is being collected from the panels.

Throughout this description, the preferred embodiment and examples illustrated should be considered as exemplars, rather than as limitations on the present invention. As used herein, the term "invention," "device," "method," "disclosure," "present invention," "present device," "present method," or "present disclosure" refers to any one of the embodiments of the invention described herein, and any equivalents. Furthermore, reference to various feature(s) of the "invention," "device," "method," "disclosure," "present invention," "present device," "present method," or "present disclosure" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "having," and similar terms, when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are to include deviations in shapes that result, for example, from manufacturing.

FIG. 1 shows a block diagram of a photovoltaic array monitoring system 100 according to one embodiment of the present disclosure. In one embodiment, the photovoltaic array monitoring system 100 comprises a data acquisition unit 15 electrically coupled via reference and ambient inputs 2, 3 with a reference photovoltaic panel 1R and an ambient photovoltaic panel 1A. In this embodiment, the data acquisition unit 15 includes a programmable integrated circuit (PIC) 10 which includes a processor 5 having operatively coupled thereto: a memory 6 for storing programmatic instructions 400 (FIG. 4) executable by the processor 5; a timing circuit 7 to activate a control circuit 16 at predetermined times and/or durations according to the programmatic instructions 400 (FIG. 4); first and second analog to digital converters (ADC) 4a, 4b to convert analog reference and ambient electrical energy applied to the reference and ambient inputs 2, 3 into a digital format compatible with the processor 5.

The programmatic instructions 400 (FIG. 4) comprise computer executable instructions stored on computer readable media (memory 6) such as, for example, ROM, RAM and/or EEPROM which form part of the PIC 10. Examples of suitable PICs 10 are model PIC18F27J13 available from MicroChip, Inc., and the STM32F205RGT6 120 MHz ARM Cortex M3 microcontroller; others are possible. Other PICs or intelligent devices may be used. For example, an application specific integrated circuit (ASIC), a microprocessor provided with suitable analog to digital circuitry, timing circuitry, and/or control circuitry, and like devices. The data acquisition unit 15 may utilize a separate microprocessor, for example an advanced RISC machine (ARM), or similar processors manufactured by Intel, AMD, Texas Instruments to name a few.

A communications interface 14 may be operatively coupled with the processor 5 over a communications bus 12. The communications interface 14 encodes indicia of electrical energy measured by the processor 5 from the reference and ambient inputs 2, 3 using the ADCs 4a, 4b into a communications protocol for communicating with a computing system 25. The computing system 25 may be communicatively coupled with the data acquisition unit wired or wirelessly directly or over network 30. Communications with the computing system 25 may be performed using any of a plurality of communications techniques including but not limited to direct serial connection, PSTN dial-up connection, cellular network, microwave, BlueTooth, WiFi, ZigBee or a packet switched network (e.g., Internet). The network 30 may be the Internet, the PSTN, a private network, a public network, a cellular telephone network, or a combination of these.

The control circuit 16 is operatively coupled to an electromechanical interface 18 which when activated, energizes a fluid pump 20. The control circuit 16 provides the control logic to energize/de-energize the fluid pump 20 using the electromechanical interface 18 to supply or disconnect power to the fluid pump 20. When energized, the fluid pump 20 draws a liquid cleaning fluid 23 from a reservoir 22 in fluidic communication with a suction side S of the fluid pump 20. The liquid cleaning fluid 23 is discharged D from the fluid pump 20 through a spray nozzle 24 and onto an active photovoltaic collection area 28 of the reference photovoltaic panel 1R with sufficient force/volume to substantially remove soiling materials deposited upon the active photovoltaic collection area 28 of the reference photovoltaic panel 1R. A fluid conduit 21 may be used to convey the cleaning fluid 20 discharged by the fluid pump 20 into the spray nozzle 24.

The combination of the reservoir 22 the fluid pump 20 and the spray nozzle 24 are referred to herein as a soiling removal unit. The soiling removal unit may also include one or more of the fluid conduit 21, the control circuit 16 and/or the electromechanical interface 18.

While the specific embodiment here describes cleaning using a liquid, it is understood that other cleaning methods are possible. Some other cleaning methods and associated devices that can be used in embodiments of the present disclosure include, for example, piezo-based cleaning using rapid vibration; automatic mechanical cleaning using, e.g., a brush or scrape type device; laser cleaning; and fluid cleaning utilizing air or another gas. Combinations of these various cleaning methods and devices are also possible.

The programmatic instructions 400 (see FIG. 4) stored in memory 6 cause the processor 5 to activate the control circuit 16 at predetermined times and for predetermined durations to ensure that the reference photovoltaic panel 1R remains substantially free of light obstructing depositional materials referred to herein as soiling materials. Stated another way, the soiling removal unit is regularly activated to clean the reference photovoltaic panel 1R. The term soiling materials includes some or all of dirt, dust, grime, insects, mineral build up, bird feces, pollen, seeds, detritus, and the like. The term soiling materials may also be referred to as depositional material, obstructing materials or fouling materials.

The reference and ambient photovoltaic panels 1R and 1A are disposed in sufficient proximity 80 to a photovoltaic array 60 such that a spatial distribution of deposited soiling materials are approximately equal upon the active photovoltaic collection areas 28, 29 of the reference and ambient photovoltaic panels 1R and 1A and at least a portion of those 61 of the photovoltaic array 60. Generally, the reference and ambient photovoltaic panels 1R and 1A can be placed such that soiling of the ambient photovoltaic panel 1A is representative of soiling on the panels 61 of the array 60. In one embodiment, the reference and ambient photovoltaic panels 1R and 1A are reduced in size from a full-size commercial photovoltaic panel of the photovoltaic array 60 (defined herein as being 196 cm×99 cm, or approximately 1.94 m$^2$). This reduction in size allows for placement of the reference and ambient photovoltaic panels 1R and 1A in sufficient proximity to the photovoltaic array 60 to encounter substantially similar depositional soiling. The reduction in size may be scaled, for example, between 1-75 of a full-size photovoltaic panel (or even less). When mounted in proximity to the photovoltaic array 60, the reference and ambient photovoltaic panels 1R and 1A are aligned such that their associated active photovoltaic collection surfaces 28, 29 parallels the active photovoltaic collection surfaces 61 of the photovoltaic array 60.

In another embodiment, a pair of existing larger (e.g. full-size, residential size (defined herein as 164 cm×99 cm, or approximately 1.62 m$^2$), or having dimensions of at least 125 cm×75 cm, or having dimensions of at least 75 cm×75 cm, or having dimensions of at least 50 cm×50 cm, or having a photovoltaic area of at least 0.25 m$^2$, or of at least 0.50 m$^2$, or of at least 0.75 m$^2$, or of at least 1 m$^2$, or of at least 1.5 m$^2$) photovoltaic panels may be retrofitted to allow connection to the data acquisition unit 15. One of the retrofitted panels may receive the benefits of the soiling removal unit and be considered the reference photovoltaic panel 1R, and the other photovoltaic panel may be considered the ambient photovoltaic panel 1A.

In either embodiment, the ambient photovoltaic panel 1R lacks the soiling removal unit, thus soiling of the ambient photovoltaic panel 1R reduces the amount of electrical energy provided to the ambient input 3 which allows for temporal comparison with the amount of electrical energy incident upon the reference input 2.

The data acquisition unit 15 measures the electrical energy incident at the output, which is created by the solar energy incident upon the reference and ambient inputs 2, 3, at predetermined intervals, encodes the electrical energy measurements into a communication protocol and transmits the encoded electrical energy measurements to the computing system 25. The computing system 25 includes a central processing unit (CPU) 26 and a main memory 27 coupled thereto. The main memory 27 includes programmatic instructions 400 (FIG. 4) executable by the CPU 25 to determine when cleaning of the photovoltaic array 60 is cost-effective relative to revenue lost due to soiling of the photovoltaic array 60. This determination is based upon temporal revenue data 40 derived from sales of generated electrical energy and remediation cost data 45 to clean the photovoltaic array 60. The result of this determination may be output to an output device 35 in a human cognizable format and/or output in a machine readable format for storage in a database 28 functionally coupled to the CPU 26.

Output device 35 may be a computer terminal, a dedicated panel, a simple LED, depending on the specific implementation.

The data acquisition unit 15 and the computing system 25 may be combined into a single unit which performs the computer implemented process 400 and outputs its determination over the communications network 30 to a remote user.

Figure 2A:
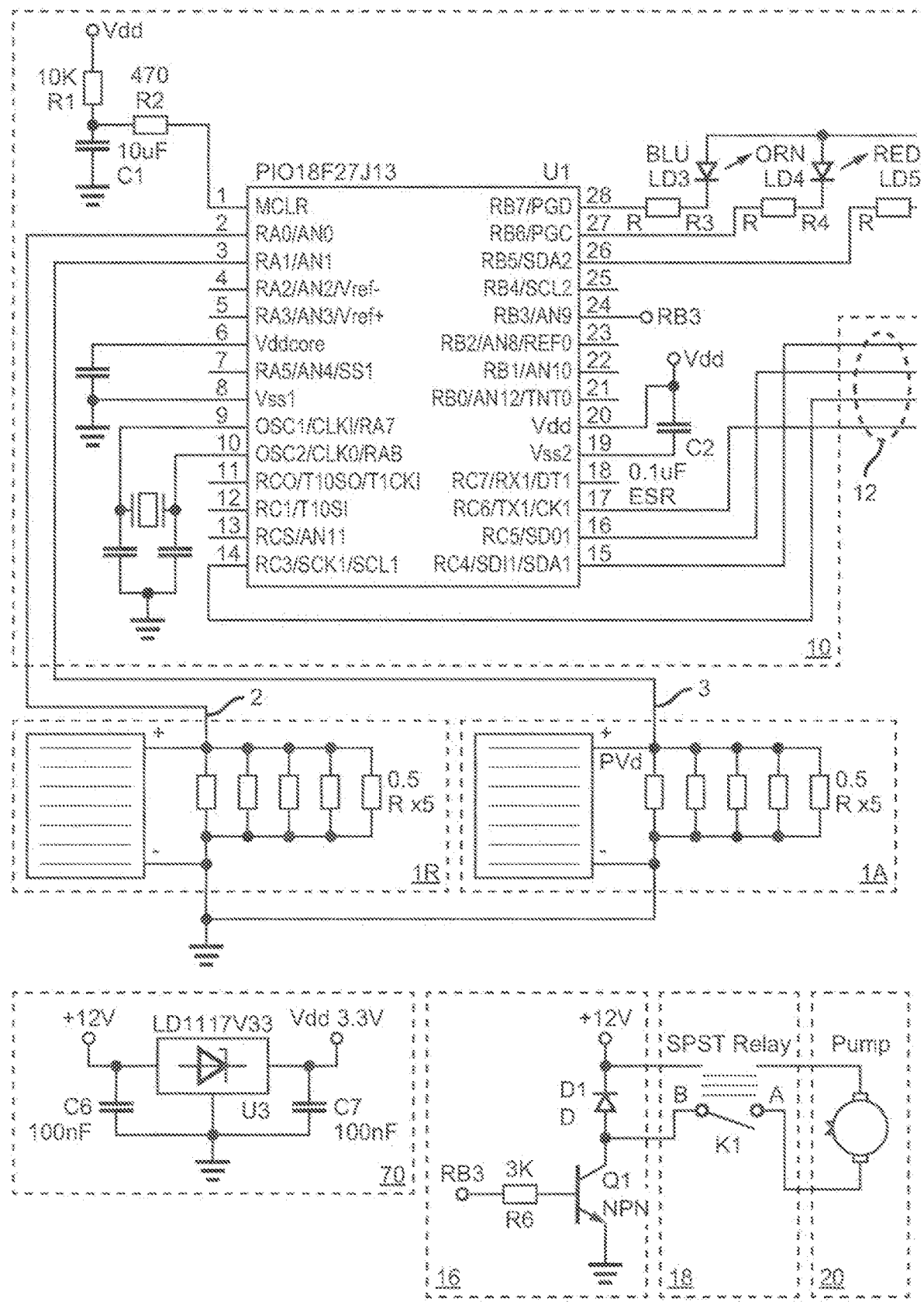
FIG. 2 is an electrical circuit diagram of a data acquisition unit of a photovoltaic array performance monitoring system according to one embodiment of the present disclosure.
Figure 2B:
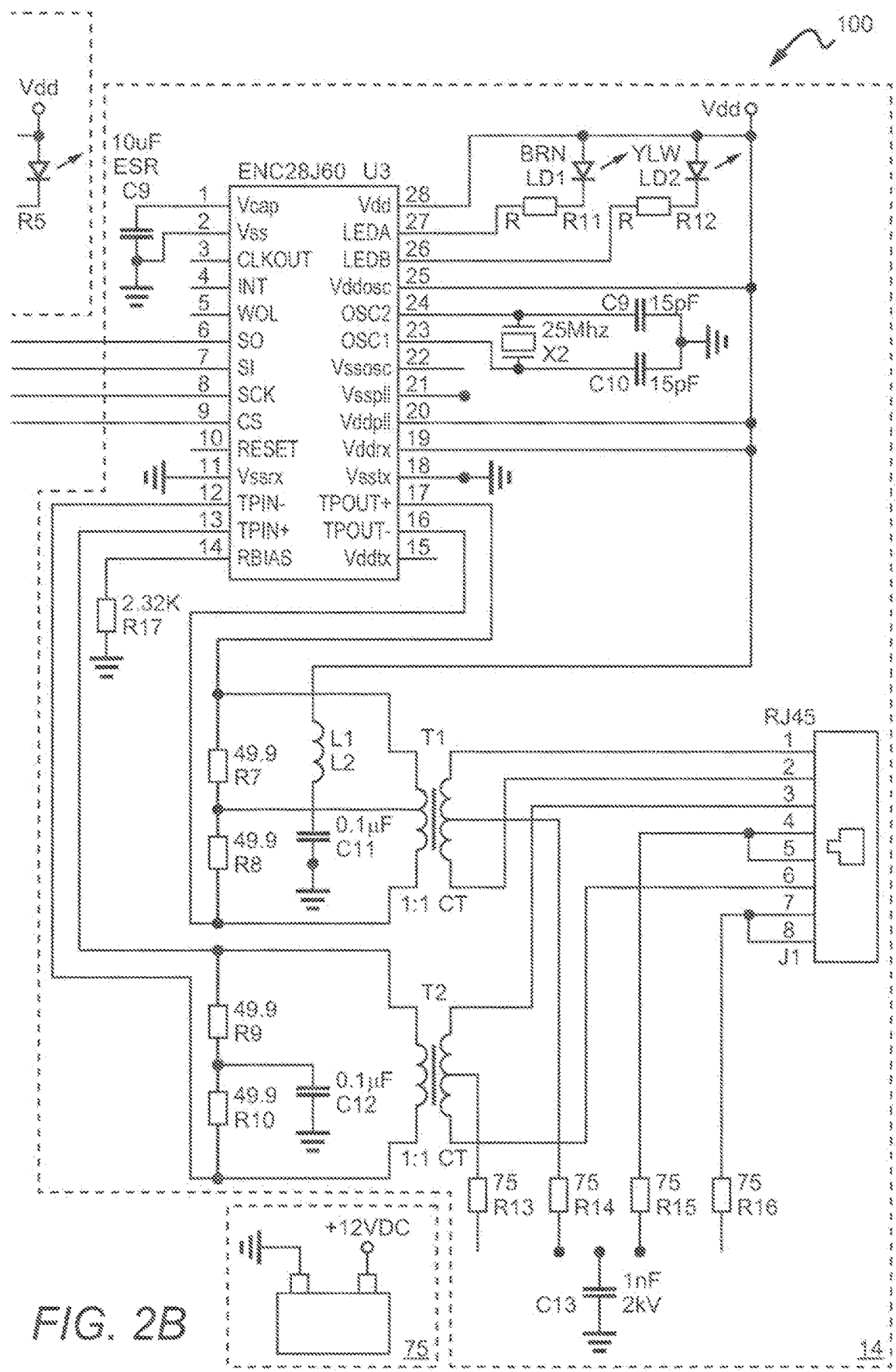

FIG. 2 is one example of an electrical circuit diagram of a data acquisition unit 15 of the photovoltaic array performance monitoring system according to one embodiment of the present disclosure. In this embodiment, the data acquisition unit 15 utilizes a programmable integrated circuit (PIC) 10. Pins 2 and 3 correspond to the analog reference and ambient inputs 2, 3 in which the reference and ambient photovoltaic panels 1R, 1A are connected. Calibration resistors may be provided for the reference and ambient photovoltaic panels 1R, 1A to compensate for minor differences in output under identical conditions.

Internal to the PIC 10, pins 2 and 3 are coupled to ADC's 4a, 4b discussed previously. The output of the ADCs 4a, 4b is periodically measured by the processor 5 and sent serially over the communications bus 12 using PIC 10 pins 14-17 to the communication interface 14. In this embodiment, the communications interface 14 encodes the received data (indicia of electrical energy) in packets compatible with TCP/IP. The communications interface 14 may be or include a network interface card or unit (NIC). The output from the communications interface 14 may be connected to a standard nine pin RJ46 jack or other connector.

Time-keeping by the data acquisition unit 15 may be accomplished using an internal clock and/or an external standard time-keeping reference.

The data acquisition unit 15 also houses the control circuit 16, electromechanical interface 18, fluid pump 20 and fluid reservoir 22 (though in other embodiments, like those described below with regard to FIGS. 5-7, many of these elements may be separated from one another, such as the electromechanical interface 18, fluid pump 20, and fluid reservoir 22 being in a separated device like the soiling removal unit 550). Power to the data acquisition unit may be supplied by power supply. The power supply may be an internal 12 VDC battery 70. The power supply directly powers a portion of the control circuit 18 coupled to the electromechanical interface 20 (relay) and the fluid pump 20 when energized by the electromechanical interface 20. A voltage regulator circuit 75 may be provided to step down the 12 VDC battery voltage to 3.3 VDC. The 3.3 VDC output of the voltage regulator circuit 75 supplies power to the PIC 10 and communications interface 14.

The power supply may be a standard AC-DC converter that may convert 120 VAC to 12 VDC.

Either or both the data acquisition unit 15 and/or communications interface 14 may be equipped with light emitting diodes which illuminate to indicate a state of the device they are coupled with.

Figure 3:
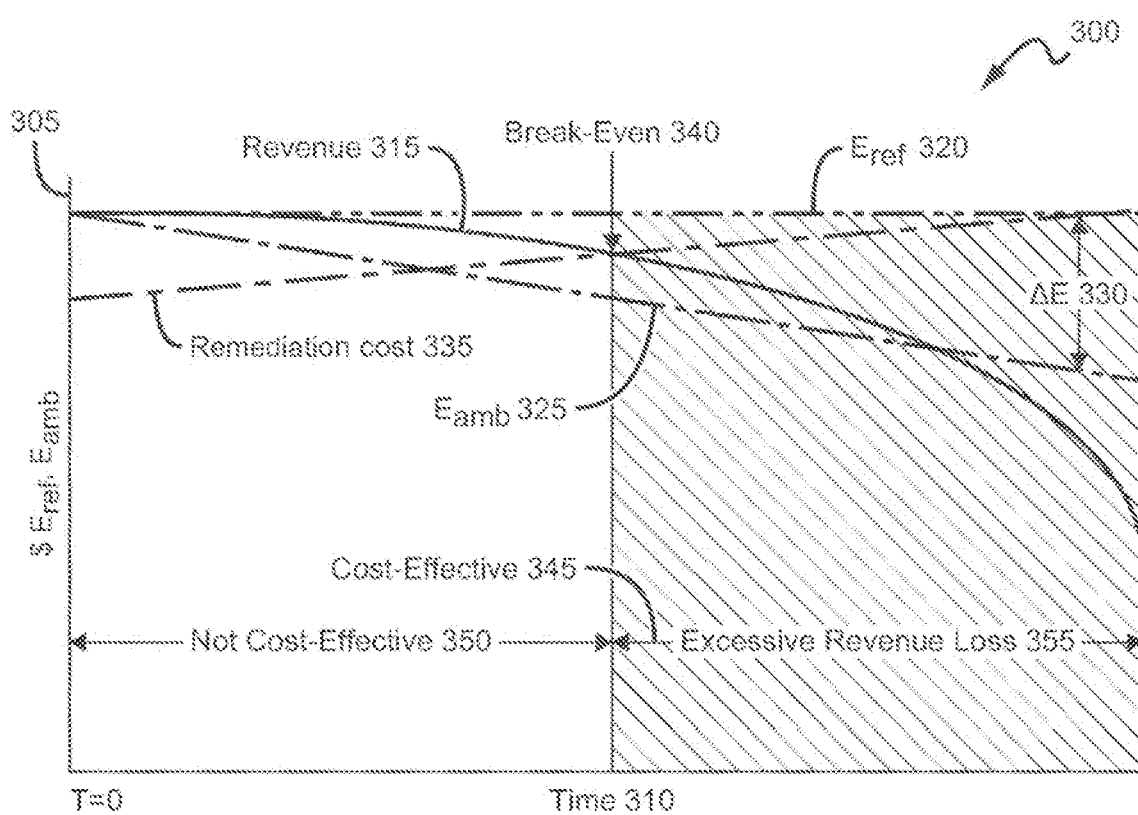
FIG. 3 is an exemplary graph showing a temporal revenue and electrical output in accordance with a photovoltaic array performance monitoring system according to one embodiment of the present disclosure.

FIG. 3 depicts an exemplary graph showing temporal revenue 315, remediation cost 335 and electrical output $E_{ref}$ 320, $E_{amb}$ 325. The ordinate 305 of the chart 300 provides relative revenue 315 produced from sales of electricity generated by the photovoltaic array 60, relative temporal electrical output $E_{ref}$ 320 from the reference photovoltaic panel 1R, relative temporal electrical output $E_{amb}$ 325 from the ambient photovoltaic panel 1A and relative cost to remediate 335 the photovoltaic array 60. The abscissa 310 of the chart 300 is time 310.

The curves shown are simplified for clarity of the concepts and to avoid variations in electrical output due to seasonal changes in solar incidence upon the photovoltaic array 60, reference and ambient photovoltaic panels 1R, 1A; variations in revenue due to changes in sales price per kilowatt-hour generated by the photovoltaic array 60; and presumed rising remediation cost over time due to greater effort required in removing accumulated deposits (soiling) from the photovoltaic array 60. In actuality, the curves are not linear due to rapid changes in wholesale electric pricing (hour-to-hour) and potential unpredictability of remediation costs.

The relative electrical output $E_{ref}$ 320 measured from the reference photovoltaic panel 1R and relative electrical output $E_{amb}$ 325 measured from the ambient photovoltaic panel 1A and revenue 315 are likewise presumed to be obtained at the same time of day (e.g., 12 noon) during daylight hours. In another embodiment, measurements are taken throughout the day. For instance, in one embodiment, measurements can be taken at intervals of 1-120 minutes, or intervals of 1-60 minutes, or intervals of 1-30 minutes, or intervals of 1-15 minutes, or intervals of 1-10 minutes, or intervals of approximately 5 minutes. Intervals outside these ranges are possible. In another embodiment, measurements are constantly being taken.

As previously discussed, the computing system 25 determines from the electrical indicia data when it is cost-effective to perform remediation of the photovoltaic array 60. At time T=0, the electrical outputs $E_{ref}$ 320, $E_{amb}$ 325 from the reference and ambient panels 1R and 1A are essentially equal. As time progresses, electrical output $E_{amb}$ 325 from the ambient photovoltaic panel 1A and the photovoltaic array 60 become soiled with light attenuating materials deposited on their respective active photovoltaic collection areas 29, 61. At some point in time the electrical differential ΔE 330 between the reference and ambient panels 1R and 1A at a given daylight time becomes significant enough to evaluate whether the photovoltaic array 60 requires remediation. The electrical differential ΔE 330 has a functional relationship with the cost of remediation 335 and revenue 315 which may be defined either empirically or by modeling. In one embodiment, ΔE is measured using the above-described intervals, such as measured using the integral of such data.

The break-even point 340 is where the declining revenue 315 curve intersects the cost to perform remediation 335. Prior to reaching the break-even point 340, it is not cost-effective 350 to perform remediation of the photovoltaic array 60 as the cost to remediate the photovoltaic array 60 exceeds the amount of revenue 315 lost due to soiling. Once the break-even point 340 is achieved, it becomes cost-effective to remediate (that is, clean or de-soil) the photovoltaic array 60 to avoid excessive revenue loss 355. When the break-even point 340 is reached, or shortly after, the entity responsible for the photovoltaic array 60 may perform remediation (cleaning, washing, desoiling) of the photovoltaic array 60. When the break-even point 340 is reached, or shortly before or after, the entity responsible for the photovoltaic array 60 may to seek a qualified bidder to perform remediation (cleaning, washing, desoiling) of the photovoltaic array 60. The qualification may be based on one or more considerations including lowest cost and scheduling availability. FIG. 3 is a simplified analysis, and it is understood that a more in-depth economic analysis could be performed to determine the most economic time to remediate. For instance, it may be more economic to remediate prior to reaching the break-even point in FIG. 3, such as at or after the intersection or remediation cost 335 and $E_{amb}$ 325 and prior to the break-even 340.

Figure 4:
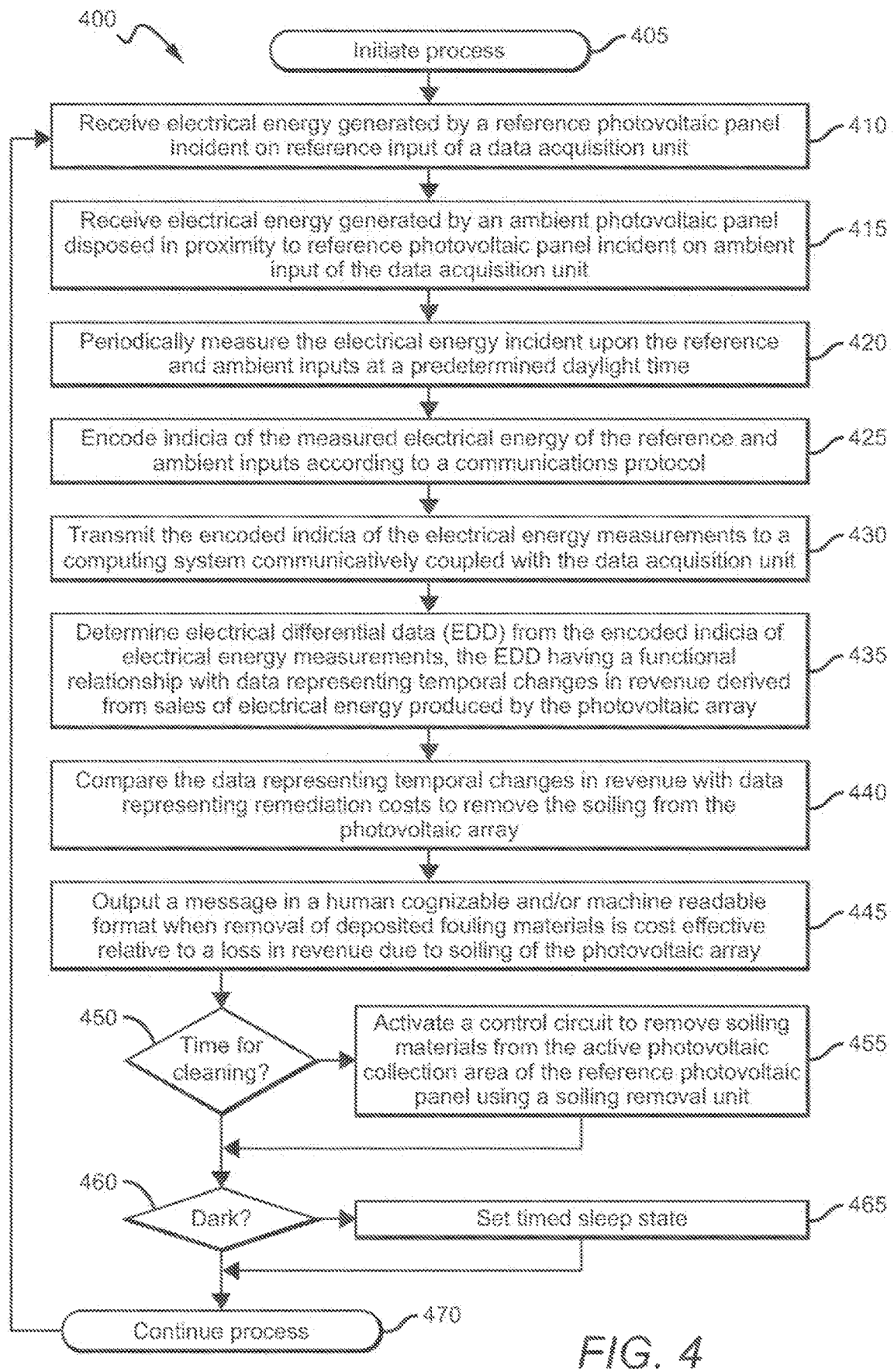
FIG. 4 is a flow chart of a computer implemented process for monitoring photovoltaic array performance according to one embodiment of the present disclosure.

FIG. 4 depicts a flow chart of one embodiment a computer implemented process 400 for monitoring photovoltaic array performance in accordance with one embodiment of the system described herein; it is understood that the steps shown can be performed in a different order than that depicted, additional steps may be included, and/or one or more shown steps may not be included. The process is initiated at block 405 and proceeds to block 410. At block 410, a data acquisition unit receives electrical energy generated by a reference photovoltaic panel incident on a reference input of the data acquisition unit. Processing continues at block 415.

At block 415, the data acquisition unit receives electrical energy generated by an ambient photovoltaic panel disposed in proximity to a reference photovoltaic panel incident on an ambient input of the data acquisition unit. Processing then continues at block 420.

At block 420, a processor associated with the data acquisition unit periodically measures the electrical energy incident upon the reference and ambient inputs at a predetermined daylight time. Processing then continues at block 425.

At block 425, the processor associated with the data acquisition unit encodes indicia of the measured electrical energy of the reference and ambient inputs according to a communications protocol. Processing then continues at block 430.

At block 430, the encoded indicia of electrical energy measurements are transmitted to a computing system communicatively coupled with the data acquisition unit. Processing then continues at block 435.

At block 435, a central processing unit associated with the computing system prepares electrical differential data (EDD) from the encoded indicia of electrical energy measurements, the EDD having a functional relationship with data representing temporal changes in revenue derived from sales of electrical energy produced by a photovoltaic array. Processing then continues at block 440.

At block 440, the central processing unit associated with the computing system compares the data representing temporal changes in revenue with data representing remediation costs to remove soiling from the photovoltaic array. Processing then continues at block 445.

At block 445, the central processing unit associated with the computing system outputs a message in a human cognizable and/or machine readable format when removal of deposited soiling materials is cost-effective relative to a loss in revenue due to soiling of the photovoltaic array. Processing then continues at block 450.

At decision block 450, the processor associated with the data acquisition unit determines whether it is time for cleaning of the reference photovoltaic panel. If the processor associated with the data acquisition unit determines that it is not time for cleaning of the reference photovoltaic panel, processing continues at decision block 460. At block 455, if the time for cleaning of the reference photovoltaic panel has arrived, the control circuit initiates removal of soiling materials from the photovoltaic collection area of the reference photovoltaic panel using a soiling removal unit. Processing then continues at decision block 460.

At decision block 460, the processor associated with the data acquisition unit determines whether it is dark or reduced light such as, for example, when it is night or cloudy. If the processor associated with the data acquisition unit determines that it is not dark, processing continues at block 470 which restarts the process at block 410. Alternately, if the processor associated with the data acquisition unit determines that it is dark, processing continues at block 465. The determination of whether it is dark may be made based on observed light conditions and/or by reference to a clock and stored daylight information.

At block 465, the processor associated with the data acquisition unit sets a timed sleep state which reduces power consumption of the data acquisition unit. Once the sleep state time has expired, processing continues at block 470 which restarts the computer implemented process at block 410. The length of the timed sleep state may be an hour, such that the system hourly checks to see if it is light. The system may access locally or remotely stored daylight information that provides data about sunrise and sunset times. The system may use the stored daylight information to compute the length of the timed sleep state on a daily basis or may have the length available in a pre-computed lookup table. In this way, the system may automatically turn on or off based on the stored daylight information.

In other embodiments, the system may sleep daily or weekly such that the data acquisition unit only wakes up once a day or once a week, or other regular or irregular period of time or days. In one embodiment, whenever the data acquisition unit wakes, it automatically activates the soiling removal unit to clean the reference photovoltaic panel.

Figure 5:
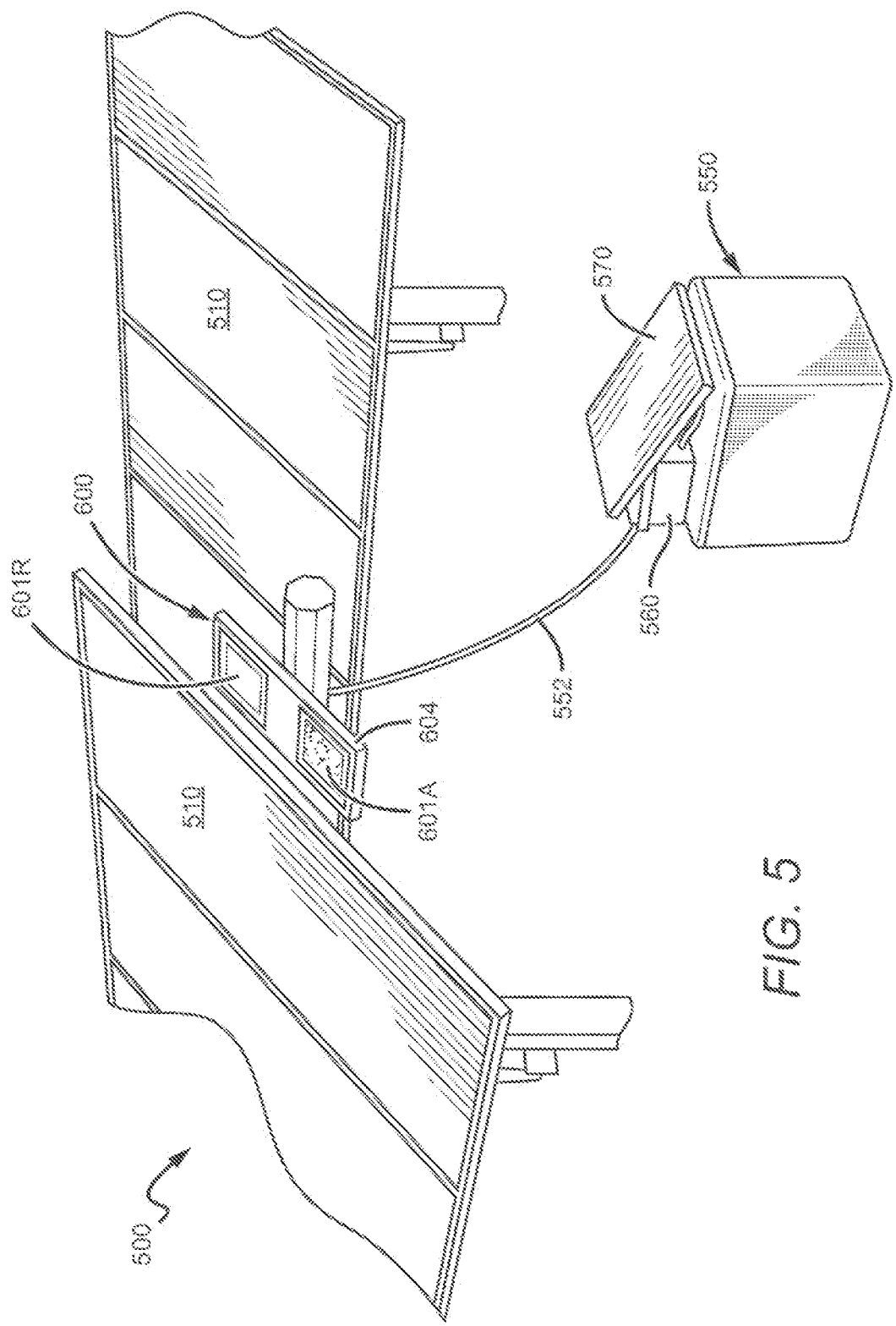
FIG. 5 shows a photovoltaic array including a photovoltaic array monitoring system according to one embodiment of the present disclosure.

FIG. 5 shows a photovoltaic array 500 according to one embodiment of the present disclosure including a soiling removal unit 550 and a photovoltaic array monitoring system 600 (hereinafter referred to as a "monitoring system" for simplicity). The soiling removal unit can be part of the monitoring system 600, or can be separate from the monitoring system 600 as shown in FIG. 5. The monitoring system 600 can include a reference photovoltaic panel 601R and an ambient photovoltaic panel 601A, which can be equivalent or similar to the panels 1R, 1A described above. FIG. 6 shows a close-up of the panels 601R, 601A after the panel 601A has experienced noticeable soiling. FIG. 7 shows an example internal view of the monitoring system 600. It is understood that the components and methods of FIGS. 5-7 can be similar to or the same as components previously described with regard to FIGS. 1-4. For instance, the monitoring system 600 can correspond to the photovoltaic array monitoring system 100 and can include some or all of the same components, and vice versa; the soiling removal unit 550 can correspond to the soiling removal unit described with regard to FIGS. 1-4 and can include some or all of the same components, and vice versa; the methods described with regard to FIGS. 1-4 (including but not limited to the method shown and described with regard to FIG. 4) can be utilized with the devices shown in FIGS. 5-7, and vice versa; etc.

The photovoltaic array 500 can include one or more photovoltaic panels 510 as known in the art. The monitoring system 600 can be proximate to the photovoltaic array 500. For instance, the monitoring system 600 can be located within the array field (or future array field in instances where the monitoring system is placed before the array), attached to one of the photovoltaic array panels 510 as shown, or otherwise proximate the array 500. In the specific embodiment shown, the monitoring system is mounted on the same structure as one or more of the photovoltaic panels 510, though it is understood that other placements are possible.

The soiling removal unit 550 can be proximate the monitoring system 600, and can be physically connected to the monitoring system 600 as shown. The soiling removal unit 550 can be similar to or the same as the soiling removal unit described with regard to FIGS. 1-4, and can include the same/similar components, fewer components, or additional components. The soiling removal unit 550 can be procedurally and electrically connected to the monitoring system 600 in the same manner as described with regard to FIGS. 1-4, and can operate in the same or similar manner. A fluid delivery system 552, such as a tube, can be included to transport cleaning fluid to clean the ambient photovoltaic panel 601A. It is understood that in some embodiments a soiling removal unit may be part of the monitoring system itself.

The soiling removal unit 550 can also include an electromechanically interface. In one specific embodiment, a DC voltage and current are applied across an electrical coil, and a pump begins moving water as the motor spins. A sensor can also be included and connected to the pump voltage line in order to measure the current draw from the pump (though types of sensors other than current sensors are possible). This measurement can be used to determine if the pump is running (or has run) successfully, if there is water in the line, and/or if the water line is blocked. A communication connection can also be included within the physical connection or via a separate physical connection, or wireless communication as known in the art is also possible.

The soiling removal unit 550 can include a power source 560. In the specific embodiment shown, the power source 560 is a battery, such as a 12V lead acid battery, though it is understood that other power sources both internal and external are possible. The soiling removal unit 550 can also be self-charging. For instance, in the embodiment shown, the unit 550 includes a photovoltaic panel 570 which can be used to recharge the power source 560. The use of a rechargeable power source such as the power source 560 in combination with a power source such as the photovoltaic panel 570 results in a soiling removal unit 550 that needs minimum maintenance, as power source replacement is generally unnecessary. It is understood, however, that soiling removal units according to the present disclosure do not necessarily need to include these components, and many different types of power (e.g., replaceable battery, plug-in, etc.) are possible.

Additionally, while the soiling removal unit 550 is described as a fluid soiling removal unit similar to that previously described, it is understood that it may be another type of removal unit. For instance, it may be a piezo-based cleaning unit using, e.g., rapid vibration; an automatic mechanical cleaning unit using, e.g., a brush or scrape type device; a laser cleaning unit; a fluid cleaning unit utilizing air or another gas; another type of photovoltaic cleaning unit as known in the art; or a combination of any of these. Such soiling removal units may be powered and/or connected to the monitoring system 601 similarly to or the same as the soiling removal unit 55C. It is further understood that a soiling removal unit may not be included in some embodiments; for instance, the reference ambient panel 601R could be cleaned manually.

Figure 6:
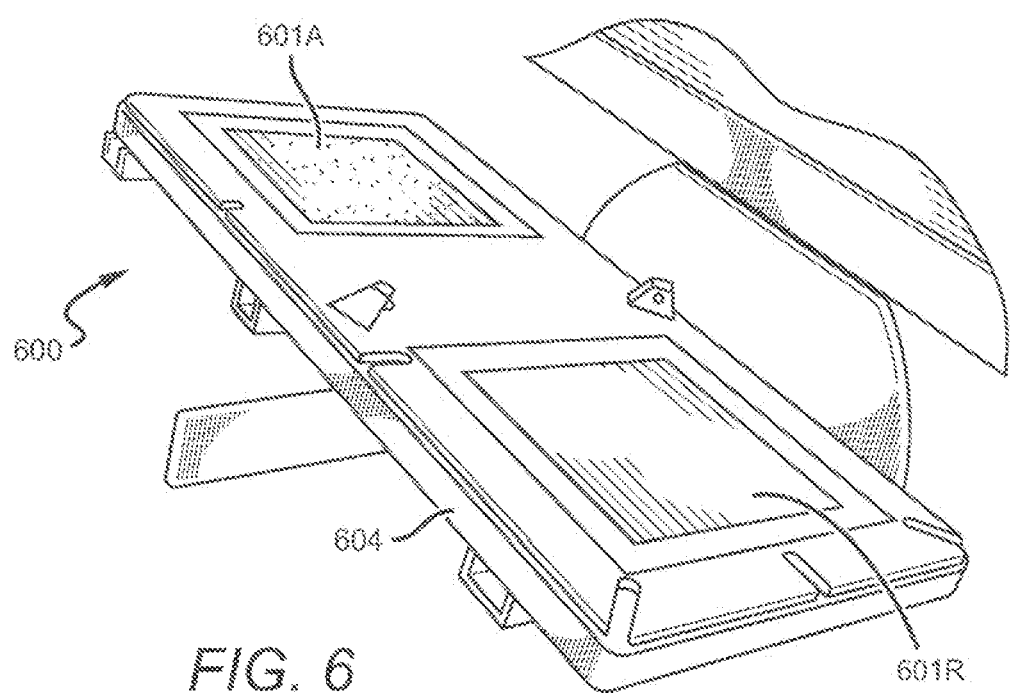
FIG. 6 shows the photovoltaic array monitoring system shown in FIG. 5.
Figure 7:
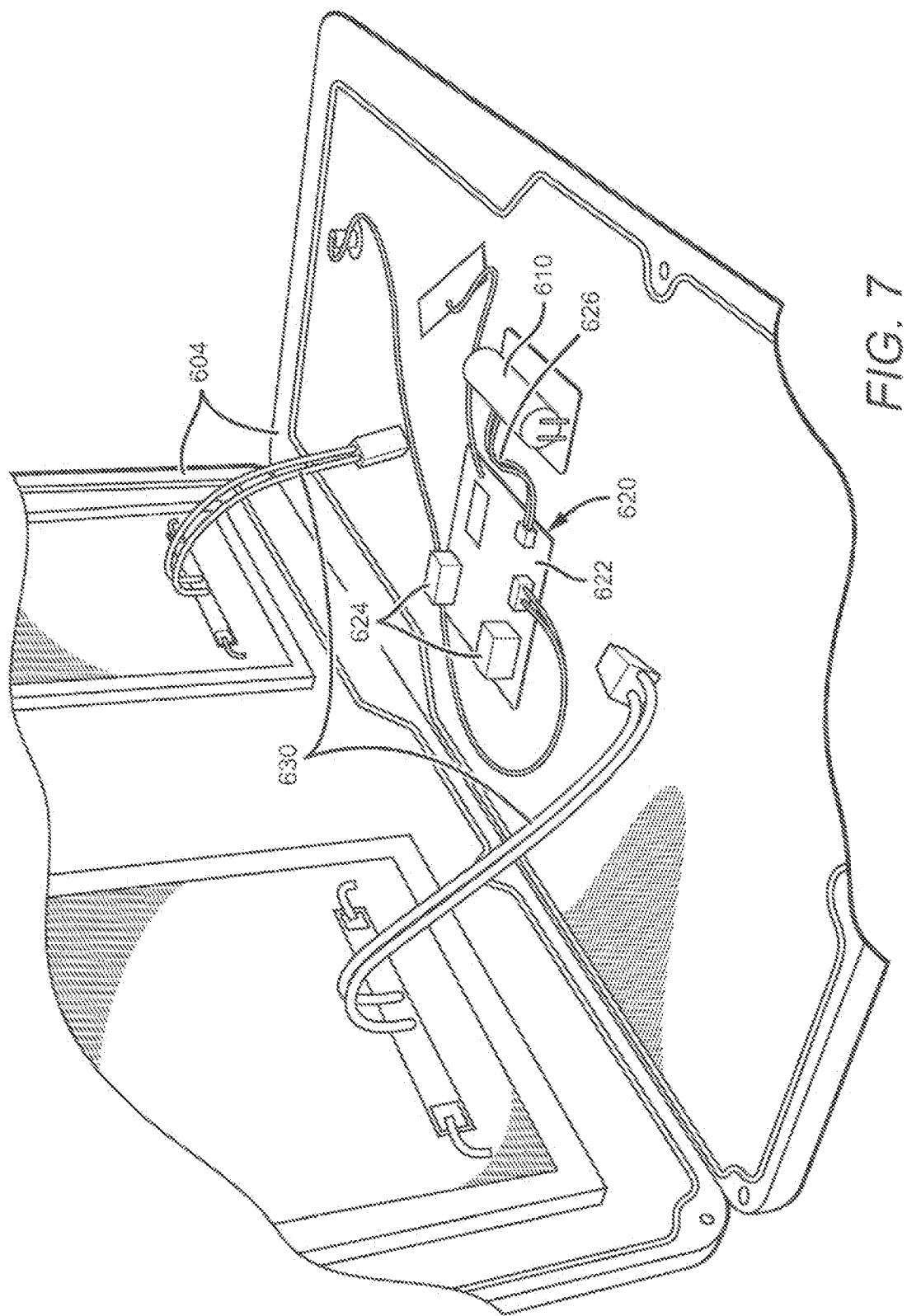
FIG. 7 shows one embodiment of an internal configuration of the photovoltaic array monitoring system shown in FIG. 5.

Shown in FIGS. 5-7 is the photovoltaic monitoring system 600. The photovoltaic monitoring system 600 can include a reference photovoltaic panel 601R (similar to and/or the same as the reference photovoltaic panel 1R) and an ambient photovoltaic panel 601A (similar to and/or the same as the ambient photovoltaic panel 1A). The monitoring system 600 can be a singular module, as shown, with the panels 601R, 601A attached to and/or included within a single casing or holder 604. The panels 601R, 601A can be mounted so as to be in the same plane and/or orientation as one another, parallel to one another, and/or in line with one another as shown, to ensure that they receive solar rays at the same angle as one another. Additionally, one or both of the panels 601R, 601A can be mounted so as to be in the same plane and/or orientation as, parallel to, and/or in line with one or more energy harvesting proximate photovoltaic panels, such as one or more of the photovoltaic panels 510 of the array 500. The energy harvesting panels can be significantly larger than each of the panels 601R, 601A, such as being at least twice as large, at least 5× as large, at least 10× as large, or larger. The total photovoltaic area of the monitoring system 600 can be less than 75, less than 50, less than 33, less than 25, less than 10, less than 5, less than 3, and/or less than 1 of the photovoltaic area of the surrounding energy harvesting panel(s) 510, or of a full-size panel, or of a residential full-size panel.

The panels 601R, 601A can have the same basic dimensions as one another (though other embodiments are possible). For instance, each of the panels 601R, 601A can have a photovoltaic area of less than 50 cm×50 cm; of approximately 30 cm×30 cm or smaller (defined as each dimension being at most approximately 31 cm); of approximately 25 cm×25 cm or smaller; of approximately 20 cm×20 cm or smaller; of approximately 16 cm×16 cm or smaller; of approximately 15.6 cm×15.6 cm or smaller; of approximately 12.5 cm×12.5 cm or smaller; of approximately 10 cm×10 cm or smaller; or even smaller. The total photovoltaic area of each of the panels 601R, 601A can be, for instance, less than 2500 $cm^2$; approximately 2000 $cm^2$ or less; approximately 1500 $cm^2$ or less; approximately 1000 $cm^2$ or less; approximately 900 $cm^2$ or less; approximately 500 $cm^2$ or less; approximately 400 $cm^2$ or less; approximately 256 $cm^2$ or less; approximately 250 $cm^2$ or less; approximately 245 $cm^2$ or less; approximately 160 $cm^2$ or less; approximately 125 $cm^2$ or less; approximately 100 or less, or even smaller. It is understood that embodiments outside of these ranges are possible. It is understood that both square and non-square embodiments (including rectangular and non-rectangular) are possible. The smaller the photovoltaic area of the reference photovoltaic panel 601R, the less effort and expense is required to keep it clean. The larger the photovoltaic areas of the reference and ambient photovoltaic panels 601R, 601A, the easier it is to charge the power source 610.

As described with regard to the panels 1R/1A, the reference photovoltaic panel 601R can be periodically cleaned (e.g. by the soiling removal unit 550) while the ambient photovoltaic panel 601A collects soiling. For instance, FIG. 6 shows one example in which the reference photovoltaic panel 601R has experienced periodic cleaning, while the ambient photovoltaic panel 601A has collected soiling. The difference in energy production between the two panels 601R, 601A can thus be measured to determine efficient timing for the cleaning of the array 500 as a whole (which can include cleaning the ambient photovoltaic panel 601A so that the ambient photovoltaic panel 601A and the surround panels 510 of the array 500 start collecting soiling at the same time, such as by using the soiling removal unit 550). The system 600 can be placed such that soiling on the ambient photovoltaic panel 601A is representative of soiling on one or more surrounding panels, such as panels of an array.

The photovoltaic monitoring system 600 can be used in conjunction with the soiling removal unit 550, or may be used without the soiling removal unit 550. This can allow the user the opportunity to use the monitoring system 600 without the additional unit, and determine himself or herself how to clean the reference photovoltaic panel 601R.

The monitoring system 600 can itself include a power source. For instance, in this specific embodiment, the monitoring system 600 includes an internal power source 610 within the casing 604, though it is understood that the power source 610 need not necessarily be within the casting 604 and that other power sources are possible. The internal power source 610 can be a battery, such as a lithium-titanate battery (which is faster to recharge than other lithium-ion batteries), a lithium-ion battery, or any other type of battery as known in the art (e.g. any typical consumer battery, such as a AA, AAA, or 9V battery). The internal power source 610 can be rechargeable using power generated by the monitoring system 600, such as by the reference photovoltaic panel 601R and/or the ambient photovoltaic panel 601A. In the specific embodiment shown, the panels 601R, 601A are connected to an electrical unit 620 (which can be similar in many respects to the PIC 10). This connection can be made using connection methods and devices known in the art, such as solar cell wiring 630 (shown in FIG. 7 as disconnected, though they can be connected to the electrical unit 620). The electrical unit 620 can include, for example, a PCB 622, and solar cell wiring inputs 624 for connection to solar cell wiring 630. The electrical unit 620 may also include a transmitter, such as a wireless transmitter (though other data connection types are possible, such as a hardline data connection, e.g., Ethernet). It is understood that while the electrical unit 620 is shown as a singular unit, in other embodiments the various components of the electrical unit 620 may be physically separated from one another and/or be dispersed between different components.

The monitoring system 600 can have two or more modes (which can be in addition to a sleep mode, if a sleep mode is present). For instance, in one embodiment, the monitoring system 600 can have a measurement mode. When in measurement mode, the monitoring system can perform in a manner generally similar to that described above with regard to FIGS. 1-4. For instance, measurements from each of the panels 601R, 601A can be measured (e.g. continuously or at intervals), with those measurements used as an input to determine the most efficient cleaning time(s) for the array associated with the monitoring system 600. Some measurements that can be taken can include energy production, short-circuit current, irradiance, and temperature, though other measurements are possible.

The monitoring system 600 may also have an energy harvesting mode. When in energy harvesting mode, the energy produced by the panels 601R, 601A is transferred to the electrical unit 620 (such as to a solar charge controller, e.g., a solar charge controller mounted on the PCB 622, or to another element on the PCB 622). Thereafter, the energy can be transferred from the electrical unit 620 to the internal power source 610, such as via a battery connection 626. Thus, the internal power source 610 can be recharged using only other components of the monitoring system 600, avoiding the inconvenience of a hardline connection or replacement of a battery.

In the specific embodiment shown, energy produced by both panels 601R, 601A is used to power the internal power source 610; however, it is understood that in other embodiments, just the panel 601R may be used, just the panel 601A may be used, and/or the panels 601R/601A may be used at different times, whether overlapping or not. Many different embodiments are possible.

Additionally, in one embodiment, the panels 601R, 601A can be connected to one another in series, resulting in the overall voltage being the sum of the individual voltages. This can be useful in that it can increase the overall voltage to a level that is usable for charging purposes. It is understood, however, that other embodiments are possible, such as embodiments when the panels 601R, 601A are connected in parallel or not connected to one another at all.

A change between modes, such as the change between measurement mode and energy harvesting mode, can be accomplished in numerous manners. For instance, in one embodiment, the change between measurement mode and energy harvesting mode is accomplished using one or more switches (e.g., switch(es) utilizing one or more transistors such as MOSFETs) that are part of the electrical unit 620. For instance, in one specific embodiment, a switch is turned OFF during energy harvest mode, resulting in a connection to the solar charge controller. To enact a transition to measurement mode, the switch can be turned ON, effectively shorting the power generating connections to the panels 601R/601A. Additionally or in place of this, the solar charge controller could also be turned OFF. It is understood that other switching mechanisms as would be understood by one of skill in the art are possible.

Additionally, switching can be triggered in numerous different ways. For instance, in one embodiment, the monitoring system 600 switches to energy harvesting mode when the energy and/or voltage within the power source 61') falls (or is otherwise measured to be) below a certain threshold. In another embodiment, switching is on a timer, such that energy is harvested to the power source 610 at regular intervals. In another embodiment, switching can be performed manually, such as by a user at a remote location. Combinations of these and other embodiments are possible.

Data from the monitoring system 600 can be transmitted in any number of ways. In one embodiment, the monitoring system (such as the electrical unit 620) can include a transmitter, such as a wireless transmitter. The transmitter can transmit measurement data taken from the panels 601R, 601A to another device and/or to the cloud. In one embodiment, transmission can be accomplished using a cellular connection. It is understood that other communication methods are possible, such as hardline communication, e.g. via an Ethernet connection.

The monitoring system 600 can in some embodiments be ready for use immediately "out of the box," without the need for additional setup. For instance, upon the monitoring system 600 being placed in the sun, the monitoring system 600 can be in energy harvesting mode and the power source 610 can begin to charge (though in another embodiment the power source 610 can be pre-charged). Upon achieving a sufficient battery voltage, the monitoring system 600 can measure the short-circuit current of the panels 601R, 601A to determine whether there is enough available light for operation. If there is not enough light, then the monitoring system 600 can check again at later times. If there is enough light, the monitoring system 600 can turn on and attempt to connect to the nearest communication source, e.g., a cellular tower. Once connected, the stream of data from the monitoring system 600 can begin. This stream of data can be sent, e.g., to the cloud or a server, and can be made available for viewing, such as via a web portal.

In order to calculate the optimal cleaning day(s) for the array 500, a variety of different data can be used. The location of the monitoring system 600 (and, therefore, the array 500) can be manually input by a user, or can be measured using a locator included as part of the monitoring system 600. The user can input various array characteristics, such as number of panels, panel size, etc. Other inputs can include local data from the array 500 such as efficiency and energy output; financial data (e.g., the cost of performing a cleaning); and/or environmental data (e.g., historical precipitation, the past effects of precipitation on the array, weather forecasts). These inputs can be run through an algorithm to determine the optimal number of cleanings in a given time period (e.g., a year), the best day or days to perform the array cleanings, soiling loss forecasts, revenue projections for different cleaning regimens, and/or other information relevant to a solar array operator.

The monitoring system 600 has been described herein as a separate and transportable component. However, it is understood that arrays such as the array 500 can be deployed using an internal monitoring system that is part of the array 500, such as part of one of the panels 510, or that an array and/or panel can be retrofitted to include these components and capabilities. For instance, portions of one of the panels can serve as the reference and ambient photovoltaic panels as previously described, and the other components of monitoring systems described herein could be included with the panel 510. Many different embodiments are possible as would be understood by one of skill in the art.

The various exemplary inventive embodiments described herein are intended to be merely illustrative of the principles underlying the inventive concept. It is therefore contemplated that various modifications of the disclosed embodiments will without departing from the inventive spirit and scope be apparent to persons of ordinary skill in the art. They are not intended to limit the various exemplary inventive embodiments to any precise form described. In particular, it is contemplated that the data acquisition unit 15 and/or electrical unit 620 may utilize different electronic components and layouts than those described herein. No specific limitation is intended to executable instruction sequences described herein. Other variations and inventive embodiments are possible in light of the above teachings, and it is not intended that the inventive scope be limited by this specification, but rather by the claims following herein.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above. Moreover, it is contemplated that combinations of features, elements, and steps from the appended claims may be combined with one another as if the claims had been written in multiple dependent form and depended from all prior claims. Combination of the various devices, components, and steps described above and in the appended claims are within the scope of this disclosure. The foregoing is intended to cover all modifications and alternative constructions falling within the spirit and scope of the invention.

We claim:

1. A photovoltaic array monitoring system, comprising:
    a reference photovoltaic panel;
    an ambient photovoltaic single-cell panel;
    a rechargeable power source;
    an electrical unit configured to charge said rechargeable power source using energy from one or both of said reference photovoltaic panel and said ambient photovoltaic single-cell panel; and
    a transmitter configured to transmit data from said reference photovoltaic panel and said ambient photovoltaic single-cell panel.

2. The system of claim 1, further comprising a casing, said electrical unit and said rechargeable power source within said casing.

3. The system of claim 1, wherein said reference photovoltaic panel and said ambient photovoltaic single-cell panel are coplanar.

4. The system of claim 1, wherein energy from both of said reference photovoltaic panel and said ambient photovoltaic single-cell panel is used to charge said rechargeable power source.

5. The system of claim 4, wherein said reference photovoltaic panel and said ambient photovoltaic single-cell panel are connected to one another in series when charging said rechargeable power source.

6. The system of claim 1, having a measurement mode and an energy harvesting mode;
    wherein said electrical unit charges said rechargeable power source during said energy harvesting mode; and
    wherein said transmitter transmits said data during said measurement mode.

7. The system of claim 6, wherein said system is in energy harvesting mode when said rechargeable power source is below a minimum energy and/or voltage threshold.

8. The system of claim 1, further comprising a soiling removal unit configured to clean said reference photovoltaic panel.

9. The system of claim 8, wherein said soiling removal unit is separate from a main body of said system.

10. The system of claim 8, wherein said soiling removal unit is configured to clean said reference photovoltaic panel while allowing soiling to develop on said ambient photovoltaic single-cell panel.

11. The system of claim 1, wherein said transmitter is configured to transmit data over a cellular network.

12. The system of claim 1, wherein said data includes on or more of short-circuit current, irradiance, and temperature from each of said reference photovoltaic panel and said ambient photovoltaic single-cell panel.

13. The system of claim 1, wherein said reference photovoltaic panel is a single-cell panel.

14. The system of claim 1, wherein said reference photovoltaic panel and said ambient single-cell panel are attached to and at the same orientation as a larger photovoltaic panel.

15. A method for monitoring a solar array comprising one or more solar panels, comprising:
    placing a monitoring system proximate to said solar array, said monitoring system comprising a reference photovoltaic panel, an ambient photovoltaic single-cell panel, and a rechargeable power source;
    charging said rechargeable power source using energy produced by said reference photovoltaic panel and/or said ambient photovoltaic single-cell panel;
    measuring data comprising one or more of short-circuit current, irradiance, and temperature from each of said reference photovoltaic panel and said ambient photovoltaic single-cell panel; and
    transmitting said data from said monitoring system.

16. The method of claim 15, further comprising periodically cleaning said reference photovoltaic panel while allowing soiling to develop on said ambient photovoltaic single-cell panel.

17. The method of claim 15, wherein said placing comprises placing said monitoring system on the same structure as one of said solar panels.

18. A transportable photovoltaic array monitoring system, comprising:
- a holder;
- a reference photovoltaic panel attached to said holder;
- an ambient photovoltaic panel attached to said holder; and
- a soiling removal unit configured to clean soiling from said reference photovoltaic panel;
- wherein said reference photovoltaic panel and said ambient photovoltaic panel combine to form a photovoltaic area of less than 0.25 m$^2$.

19. The system of claim 18, wherein said data comprises one or more of short-circuit current, irradiance, and temperature from each of said reference photovoltaic panel and said ambient photovoltaic panel, wherein said data can be used in combination with other information to determine an efficient cleaning schedule for said at least one full-size solar panel.

20. The system of claim 18, further comprising a rechargeable power source attached to said holder.

21. The system of claim 18, further comprising an electrical unit attached to said holder and configured to charge said rechargeable power source using energy from one or both of said reference photovoltaic panel and said ambient photovoltaic panel.

22. The system of claim 18, further comprising a transmitter attached to said holder and configured to transmit data from said reference photovoltaic panel and said ambient photovoltaic panel.

* * * * *